(12) United States Patent
Benjamin et al.

(10) Patent No.: US 10,378,380 B2
(45) Date of Patent: Aug. 13, 2019

(54) SEGMENTED MICRO-CHANNEL FOR IMPROVED FLOW

(71) Applicant: General Electric Company, Schenectady, NY (US)

(72) Inventors: Marc Lionel Benjamin, Taylors, SC (US); Benjamin Paul Lacy, Greer, SC (US); Luis Alfonso Gonzalez, Simpsonville, SC (US); Michael Scott Soden, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1065 days.

(21) Appl. No.: 14/971,674

(22) Filed: Dec. 16, 2015

(65) Prior Publication Data

US 2017/0175575 A1 Jun. 22, 2017

(51) Int. Cl.
*F01D 25/12* (2006.01)
*F01D 25/24* (2006.01)
(Continued)

(52) U.S. Cl.
CPC .............. *F01D 25/12* (2013.01); *F01D 9/04* (2013.01); *F01D 11/08* (2013.01); *F01D 25/14* (2013.01);
(Continued)

(58) Field of Classification Search
CPC . F01D 9/04; F01D 11/08; F01D 25/12; F01D 25/14; F01D 25/24; F01D 25/246;
(Continued)

(56) References Cited

U.S. PATENT DOCUMENTS 4,490,773 A 12/1984 Mofatt
5,538,393 A * 7/1996 Thompson .............. F01D 11/08
415/115

(Continued)

FOREIGN PATENT DOCUMENTS

EP 1775425 A2 4/2007
EP 2060745 A2 5/2009
(Continued)

OTHER PUBLICATIONS

U.S. Appl. No. 14/971,383, filed Dec. 16, 2015, Marc Lionel Benjamin.

(Continued)

*Primary Examiner* — Igor Kershteyn
(74) *Attorney, Agent, or Firm* — Fletcher Yoder, P.C.

(57) ABSTRACT

A system includes a shroud segment for use in a turbine and includes a body having a leading and trailing edge, first and second side edge, and a pair of opposed lateral sides between the leading and trailing edges and the first and second side edges. A first lateral side interfaces with a cavity having a cooling fluid. A first channel includes a first and second end portion. A second channel includes a third end portion and a fourth end portion. The first and second channels receive the cooling fluid from the cavity to cool the body. The second end portion includes a first segmented channel with first metering feature and the third end portion includes a second segmented channel with second exit feature. The first and second exit features meter a flow of the cooling fluid within the first and second channels.

20 Claims, 7 Drawing Sheets

(51) Int. Cl.
| | |
|---|---|
| *F01D 9/04* | (2006.01) |
| *F02C 3/04* | (2006.01) |
| *F04D 29/52* | (2006.01) |
| *F01D 25/14* | (2006.01) |
| *F02C 7/18* | (2006.01) |
| *F04D 29/58* | (2006.01) |
| *F02C 7/12* | (2006.01) |
| *F01D 11/08* | (2006.01) |

(52) U.S. Cl.
CPC ........... *F01D 25/24* (2013.01); *F01D 25/246* (2013.01); *F02C 3/04* (2013.01); *F02C 7/12* (2013.01); *F02C 7/18* (2013.01); *F04D 29/522* (2013.01); *F04D 29/584* (2013.01); *F05D 2220/32* (2013.01); *F05D 2230/12* (2013.01); *F05D 2230/237* (2013.01); *F05D 2240/11* (2013.01); *F05D 2240/24* (2013.01); *F05D 2240/35* (2013.01); *F05D 2260/204* (2013.01); *Y02T 50/676* (2013.01)

(58) Field of Classification Search
CPC ...... F02C 3/04; F02C 7/12; F02C 7/18; F04D 29/522; F04D 29/584; F05D 2220/32; F05D 2230/12; F05D 2240/11; F05D 2240/24; F05D 2240/35; F05D 2260/204; Y02T 50/676
See application file for complete search history.

(56) References Cited

U.S. PATENT DOCUMENTS

| | | | |
|---|---|---|---|
| 5,829,245 A | 11/1998 | McQuiggan et al. | |
| 6,113,553 A | 9/2000 | Chubbuck | |
| 6,179,557 B1* | 1/2001 | Dodd | F01D 9/00 415/108 |
| 6,278,379 B1 | 8/2001 | Allen et al. | |
| 6,431,005 B1 | 8/2002 | Delaye | |
| 6,890,300 B2 | 5/2005 | Lloyd et al. | |
| 6,905,302 B2 | 6/2005 | Lee et al. | |
| 7,089,790 B2 | 8/2006 | Silverbrook et al. | |
| 7,089,798 B2 | 8/2006 | Silverbrook et al. | |
| 7,240,560 B2 | 7/2007 | Silverbrook et al. | |
| 7,258,020 B2 | 8/2007 | Silverbrook et al. | |
| 7,260,995 B2 | 8/2007 | Silverbrook et al. | |
| 7,284,954 B2 | 10/2007 | Parker et al. | |
| 7,306,424 B2 | 12/2007 | Romanov et al. | |
| 7,334,480 B2 | 2/2008 | Silverbrook et al. | |
| 7,350,417 B2 | 4/2008 | Silverbrook et al. | |
| 7,464,599 B2 | 12/2008 | Silverbrook et al. | |
| 7,510,370 B2 | 3/2009 | Strangman et al. | |
| 7,513,040 B2 | 4/2009 | Cunha et al. | |
| 7,553,128 B2 | 6/2009 | Abdel-Messeh et al. | |
| 7,597,533 B1 | 10/2009 | Liang | |
| 7,621,719 B2 | 11/2009 | Lutjen et al. | |
| 7,650,926 B2* | 1/2010 | Tholen | B22C 9/04 164/35 |
| 7,653,994 B2 | 2/2010 | Dasilva et al. | |
| 7,699,059 B2 | 4/2010 | Fonseca et al. | |
| 7,770,469 B2 | 8/2010 | Nyfors et al. | |
| 7,854,170 B2 | 12/2010 | Silverbrook et al. | |
| 7,900,458 B2 | 3/2011 | James et al. | |
| 8,061,979 B1 | 11/2011 | Liang | |
| 8,449,246 B1 | 5/2013 | Liang | |
| 8,556,575 B2 | 10/2013 | Knapp et al. | |
| 8,647,053 B2 | 2/2014 | Hsu et al. | |
| 8,727,704 B2 | 5/2014 | Lee et al. | |
| 8,870,523 B2 | 10/2014 | Kottilingam et al. | |
| 8,876,458 B2 | 11/2014 | Thibodeau et al. | |
| 8,894,352 B2 | 11/2014 | Berrong et al. | |
| 8,998,572 B2 | 4/2015 | Lutjen et al. | |
| 9,017,012 B2 | 4/2015 | Brunelli et al. | |
| 9,127,549 B2 | 9/2015 | Lacy et al. | |
| 2005/0058534 A1* | 3/2005 | Lee | F01D 5/288 415/116 |
| 2005/0187482 A1 | 8/2005 | O'Brien et al. | |
| 2007/0090926 A1 | 4/2007 | Potyrailo et al. | |
| 2007/0090927 A1 | 4/2007 | Potyrailo et al. | |
| 2009/0169368 A1* | 7/2009 | Schlichting | F01D 11/122 415/173.1 |
| 2010/0080707 A1 | 4/2010 | Tholen | |
| 2011/0051775 A1 | 3/2011 | Ivanov et al. | |
| 2011/0320142 A1 | 12/2011 | Surman et al. | |
| 2012/0057968 A1 | 3/2012 | Lee et al. | |
| 2012/0114868 A1* | 5/2012 | Bunker | B23P 15/04 427/448 |
| 2012/0124832 A1* | 5/2012 | Bunker | F01D 5/147 29/888 |
| 2013/0287546 A1 | 10/2013 | Lacy et al. | |
| 2013/0340966 A1* | 12/2013 | Tholen | B22C 9/103 164/6 |
| 2014/0219780 A1* | 8/2014 | Lacy | F01D 25/12 415/116 |
| 2015/0198063 A1* | 7/2015 | Laletin | F01D 25/12 415/116 |
| 2017/0101881 A1 | 4/2017 | Romanov et al. | |
| 2017/0101890 A1 | 4/2017 | Dutta et al. | |
| 2017/0122109 A1 | 5/2017 | Bunker et al. | |
| 2017/0175574 A1 | 6/2017 | Benjamin et al. | |
| 2017/0175575 A1 | 6/2017 | Benjamin et al. | |

FOREIGN PATENT DOCUMENTS

| | | |
|---|---|---|
| EP | 2570613 A1 | 3/2013 |
| EP | 2860358 A1 | 4/2015 |
| EP | 2894301 A1 | 7/2015 |
| EP | 3153670 A1 | 4/2017 |
| EP | 3156608 | 4/2017 |
| EP | 3156612 A1 | 4/2017 |

OTHER PUBLICATIONS

U.S. Appl. No. 14/971,478, filed Dec. 16, 2015, Marc Lionel Benjamin.
U.S. Appl. No. 14/971,585, filed Dec. 16, 2015, Marc Lionel Benjamin.
U.S. Appl. No. 14/971,724, filed Dec. 16, 2015, Marc Lionel Benjamin.
Artmann, R., "Electronic identification systems: state of the art and their further development," vol. 24, Issue. 1-2, pp. 5-26 (Nov. 1999) (Abstract).
Nicolaou, K.C., et al., "Radiofrequency Encoded Combinatorial Chemistry," vol. 34, Issue. 20, pp. 2289-2291 (Nov. 3, 1995) (Abstract).
Potyrailo, R.A., et al., "Multianalyte Chemical Identification and Quantitation Using a Single Radio Frequency Identification Sensor," Materials Analysis and Chemical Sciences, vol. 79 Issues. 1, pp. 45-51 (Nov. 30, 2006) (Abstract).
Roberti, M., "A 5-Cent Breakthrough", Retrieved from the internet URL: http://www.rfidjournal.com/article/articleview/2295, on Jan. 8, 2018, pp. 2 (May 2006).
Surman, C., et al., "Temperature-independent passive RFID pressure sensors for single-use bioprocess components," IEEE International Conference on RFID, pp. 1-3 (Apr. 12-14, 2011) (Abstract).
Want, R., "Enabling ubiquitous sensing with RFID," Computer, vol. 37, Issue. 4, pp. 84-86 (Aug. 2, 2004) (Abstract).

\* cited by examiner

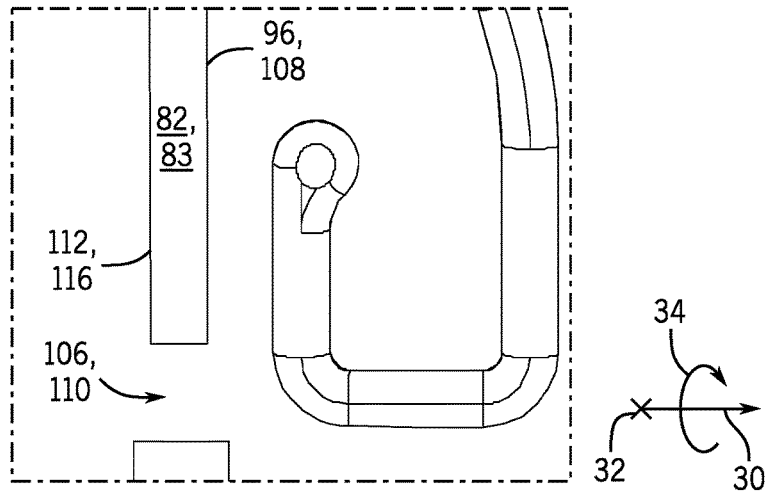
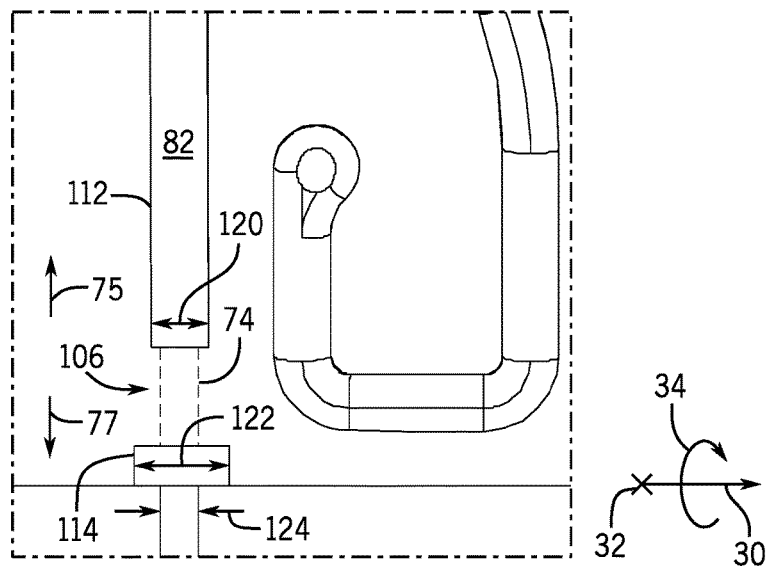
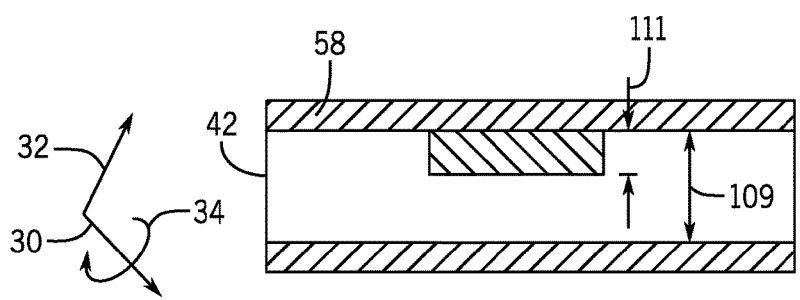

SEGMENTED MICRO-CHANNEL FOR IMPROVED FLOW

BACKGROUND

The subject matter disclosed herein relates to gas turbine engines, and more specifically, to turbine shrouds for gas turbine engines.

A turbomachine, such as a gas turbine engine, may include a compressor, a combustor, and a turbine. Gases are compressed in the compressor, combined with fuel, and then fed into to the combustor, where the gas/fuel mixture is combusted. The high temperature and high energy exhaust fluids are then fed to the turbine along a hot gas path, where the energy of the fluids is converted to mechanical energy. High temperatures along the hot gas path can heat turbine components (e.g., turbine shroud), causing degradation of components.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a shroud segment for use in a turbine section of a gas turbine engine. The system includes a body including a leading edge, a trailing edge, a first side edge, a second side edge, and a pair of opposed lateral sides between the leading and trailing edges and the first and second side edges. A first lateral side of the pair of opposed lateral sides is configured to interface with a cavity having a cooling fluid. A second lateral side of the pair of opposed lateral sides is oriented toward a hot gas flow path. The system includes a first channel disposed within the body, where the first channel comprises a first end portion and a second end portion, and the first end portion is disposed adjacent the first side edge and the second end portion is disposed adjacent the second side edge. The system includes a second channel disposed within the body, where the second channel comprises a third end portion and a fourth end portion, the third end portion is disposed adjacent the first side edge and the fourth end portion is disposed adjacent the second side edge. The first and second channels are configured to receive the cooling fluid from the cavity to cool the body. The second end portion includes a first segmented channel having a first exit feature and the third end portion comprises a second segmented channel comprising a second exit feature. The first and second exit features are configured to reduce blockage within the first and second channels, respectively.

In a second embodiment, a system includes a gas turbine engine, including a compressor, a combustion system, and a turbine section. The turbine section includes a casing, shroud segment coupled to the outer casing, and a cavity configured to receive a cooling fluid from the compressor. The shroud segment includes a body including a leading edge, a trailing edge, a first side edge, a second side edge, and a pair of opposed lateral sides between the leading and trailing edges and the first and second side edges. A first lateral side of the pair of opposed lateral sides is configured to interface with the cavity, and a second lateral side of the pair of opposed lateral sides is oriented toward a hot gas flow path. A plurality of channels is disposed within the body and extends from adjacent the first side edge to adjacent the second side edge. Each channel of the plurality of channels includes a first end portion and a second end portion. The plurality of channels is configured to receive the cooling fluid from the cavity to cool the body. The respective second end portions each have a segmented channel having an exit feature, and the respective exit features are configured to reduce blockage within the respective channels of the plurality of channels. Also provides a target for completing the channels all the way to the slash faces in In a third embodiment, a method for manufacturing an inner shroud segment for use in a turbine section of a gas turbine engine includes providing a body of the inner shroud segment, where the body includes a leading edge, a trailing edge, a first side edge, a second side edge, and a pair of opposed lateral sides between the leading and trailing edges and the first and second side edges. A first lateral side of the pair of opposed lateral sides is configured to interface with a cavity defined by the inner shroud segment coupled to an outer shroud segment. A second lateral side of the pair of opposed lateral sides is oriented toward a hot gas flow path. The method includes forming a plurality of channels within the body extending from adjacent the first side edge to adjacent the second side edge via electrical discharge machining or other suitable methods, such as milling. Each channel of the plurality of channels comprises a first end portion and a second end portion, and the respective end portions each have a segmented channel. The method includes forming target features along the first and second side edges aligned with the second end portions of the plurality of channels via electrical discharge machining, or other suitable methods such as milling. The method includes subsequent to forming the target features, brazing a pre-sintered preform layer onto the second lateral side, where the pre-sintered preform layer comprises a first surface configured to interface with the hot gas flow path and a second surface that together with the body defines the plurality of channels. The method includes subsequent to brazing the pre-sintered perform layer onto the second lateral side, forming a respective exit feature of a plurality of exit features within each second end portion of the plurality of channels via electrical discharge machining via a hole popping operation utilizing an electrode.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 7 depicts an embodiment depicting the end portions of the segmented cooling channels;

FIG. 8 depicts an embodiment depicting the dimensions of the end portions of the segmented cooling channels FIG. 9 depicts an electrode used to form exit features within the cooling channels.

DETAILED DESCRIPTION

Figure 1:
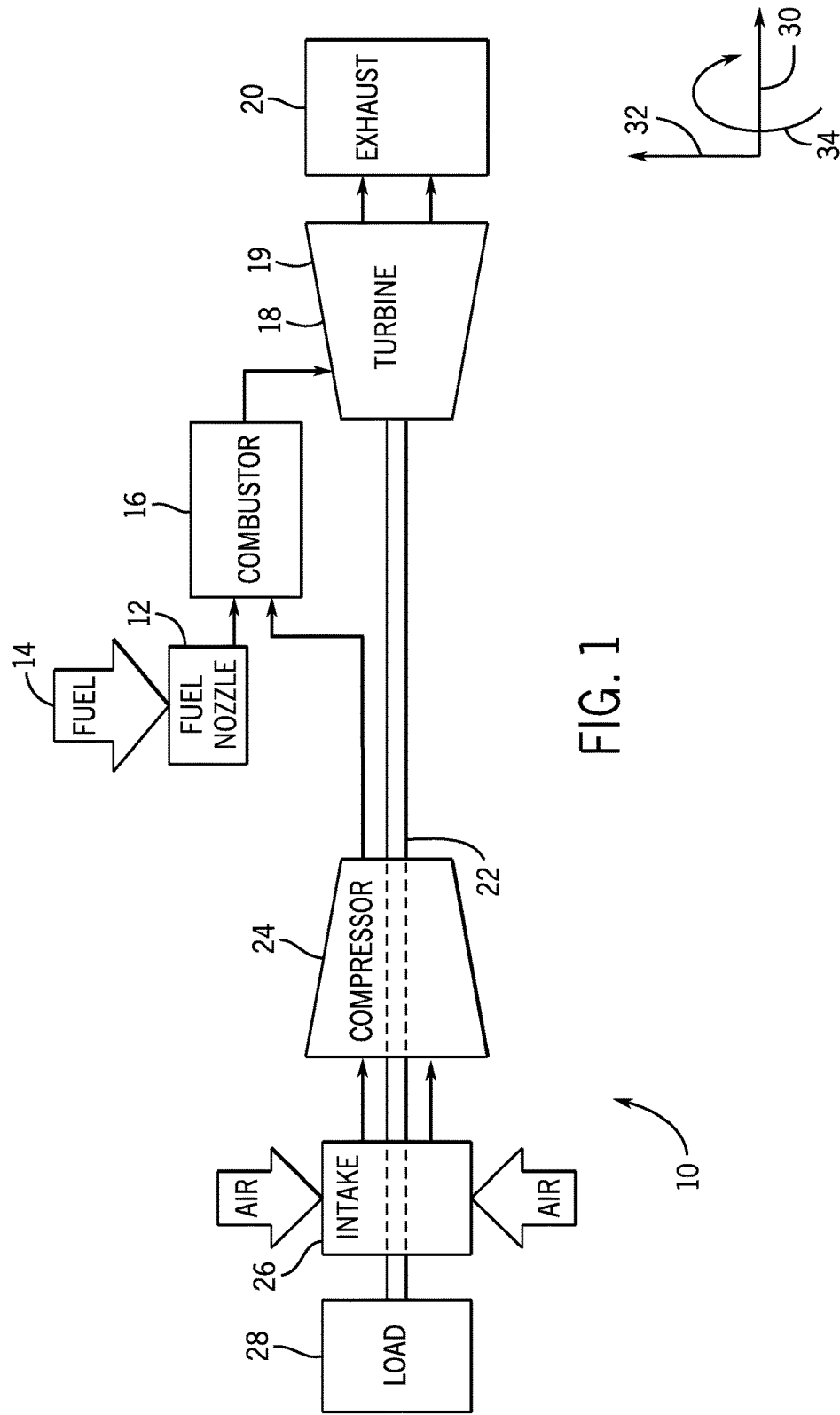
FIG. 1 is a block diagram of an embodiment of a turbine system having a turbine shroud with cooling channels.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

As discussed in detail below, certain embodiments of turbine shrouds associated with gas engines reduce the hot gas leaks between the pressure side and the suction side of a turbine blade. The turbine shrouds also provide cooling flows (e.g., air) to the turbine blade to reduce premature failure of the blade and associated blade components. The turbine shrouds as described herein utilize multiple cooling channels. The cooling channels include at least a first and a second cooling channel. The first cooling channel includes a first end portion and a second end portion. The second cooling channel includes a third end portion and a fourth end portion. The first end portion and the third end portion are disposed adjacent a first side edge of the shroud body. The second end portion and the fourth end portion are disposed adjacent a second side edge of the shroud body.

The first and second channels are configured to receive a cooling fluid (e.g., air) from a cavity formed by an inner shroud segment coupled to an outer shroud segment. The second end portion includes a first segmented channel having a first exit feature, and the third end portion includes a second segmented channel having a second exit feature. The exit features reduce the blockage of the channel during the coating operation(s) by keeping the channel from being exposed to the slash face (side face) until after the coating process is completed. The exit features may also act as a metering feature to regulate flow of the cooling fluid within the channel. The first and the second cooling channels and the first and the second exit features may be formed by a suitable process, such as electric machine discharging. For example, the first and the second cooling channels can be formed within the shroud body extending from the first side adjacent to the shroud body to a second side adjacent to a second side edge of the shroud body by electric discharge machining. The exit features (e.g., bridge portion) along the first and second side edges may be formed by any suitable process, such as electric discharge machining. The exit features are formed within the end portions (e.g., second end portion) of the channels via a suitable process, such as electric discharge machining. A hole popping operation may then be used to form an exit feature and cooling passages for flowing a cooling fluid through the exit features and the cooling passages to improve cooling of the turbine shroud.

Turning to the drawings, FIG. 1 is a block diagram of an embodiment of a turbine system 10. As described in detail below, the disclosed turbine system 10 (e.g., a gas turbine engine) may employ a turbine shroud or other components having cooling channels, described below, which may reduce the stress modes in the hot gas path components and improve the efficiency of the turbine system 10. The turbine system 10 may use liquid or gas fuel, such as natural gas and/or a hydrogen rich synthetic gas, to drive the turbine system 10. As depicted, fuel nozzles 12 intake a fuel supply 14, mix the fuel with an oxidant, such as air, oxygen, oxygen-enriched air, oxygen reduced air, or any combination thereof. Although the following discussion refers to the oxidant as the air, any suitable oxidant may be used with the disclosed embodiments. Once the fuel and air have been mixed, the fuel nozzles 12 distribute the fuel-air mixture into a combustor 16 in a suitable ratio for optimal combustion, emissions, fuel consumption, and power output. The turbine system 10 may include one or more fuel nozzles 12 located inside one or more combustors 16. The fuel-air mixture combusts in a chamber within the combustor 16, thereby creating hot pressurized exhaust gases. The combustor 16 directs the exhaust gases (e.g., hot pressurized gas) through a transition piece into a turbine nozzle (or "stage one nozzle"), and other stages of buckets (or blades) and nozzles causing rotation of a turbine 18 within a turbine casing 19 (e.g., outer casing). The exhaust gases flow toward an exhaust outlet 20. As the exhaust gases pass through the turbine 18, the gases force turbine buckets (or blades) to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. A portion of the compressed air (e.g., discharged air) from the compressor 24 may be diverted to the turbine 18 or its components without passing through the combustor 16. The discharged air (e.g., cooling fluid) may be utilized to cool turbine components such as shrouds and nozzles on the stator, along with buckets, disks, and spacers on the rotor. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10. The turbine system 10 may extend along an axial axis or direction 30, a radial direction 32 toward or away from the axis 30, and a circumferential direction 34 around the axis 30. In an embodiment, hot gas components (e.g., turbine shroud, nozzle, etc.) are located in the turbine 18, where hot gases flow across the components causing creep, oxidation, wear, and thermal fatigue of the turbine components. The turbine 18 may include one or more turbine shroud segments (e.g., inner turbine shroud segments) having a cooling passages (e.g., near surface micro-channels) to enable control of the temperature of the hot gas path components (e.g., utilizing less cooling air than typical cooling systems for shrouds) to reduce distress modes in the components, to extend service life of the components (while performing their intended functions), reduce costs associated with operating the turbine system 10, and to improve the efficiency of the gas turbine system 10.

Figure 2:
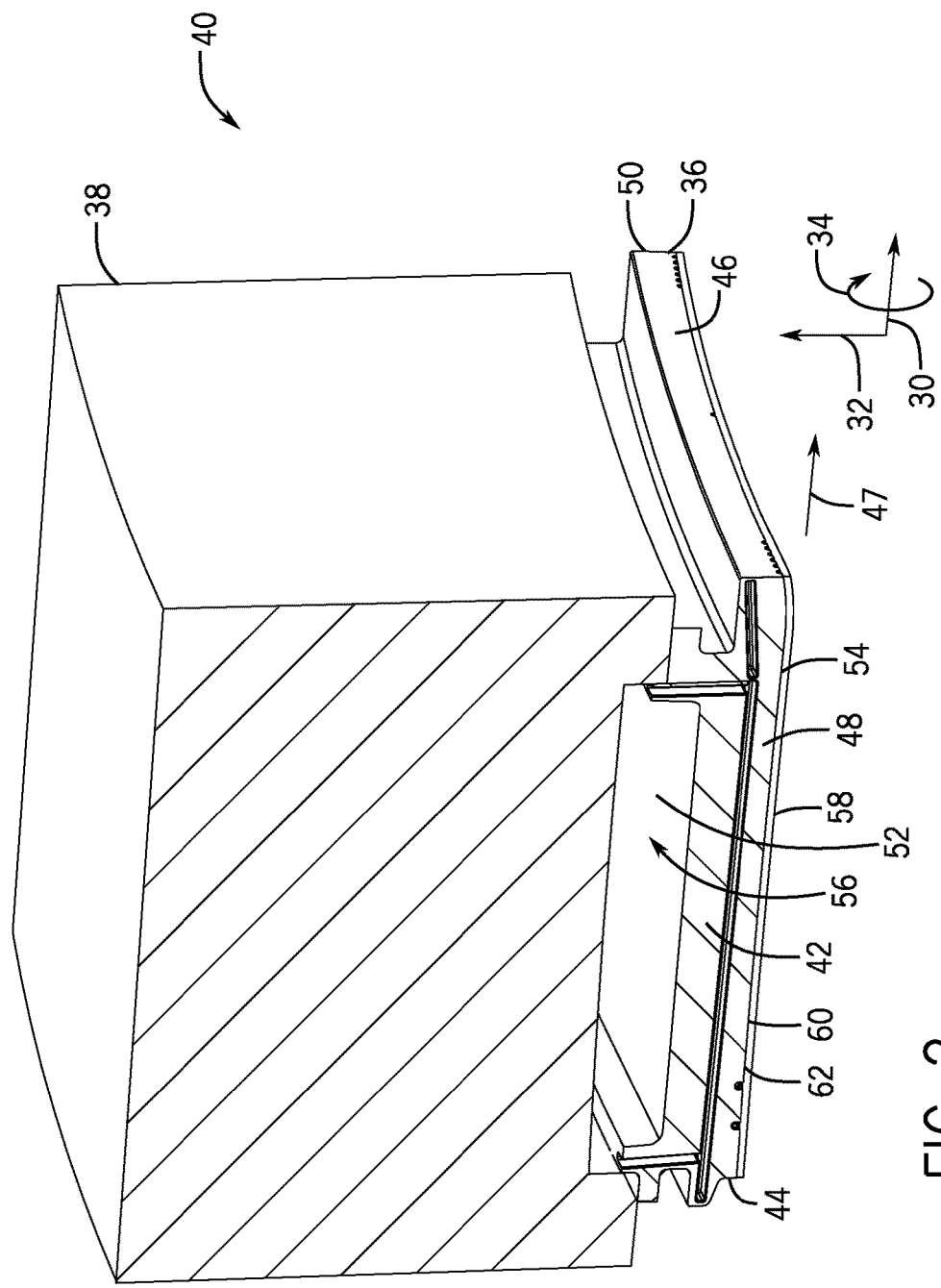
FIG. 2 is a perspective view of an embodiment of an inner turbine shroud segment coupled to an outer turbine shroud segment.

FIG. 2 is a perspective view of an embodiment of an inner turbine shroud segment 36 coupled to an outer turbine shroud segment 38 to form a turbine shroud segment 40. The turbine 18 includes multiple turbine shroud segments 40 that together form a respective ring about respective turbine stages. In certain embodiments, the turbine 18 may include multiple inner turbine shroud segments 36 coupled to respective outer turbine shroud segments 38 for each turbine shroud segment 40 disposed in the circumferential direction 34 about a rotational axis of the turbine 18 (and a turbine stage). In other embodiments, the turbine 18 may include multiple inner turbine shroud segments 36 coupled to the outer turbine shroud segment 38 to form the turbine shroud segment 40.

As depicted, the inner turbine shroud segment 40 includes a body 42 having an upstream or leading edge 44 and a downstream or trailing edge 46 that both interface with a hot gas flow path 47. The body 42 also includes a first side edge 48 (e.g., first slash face) and a second side edge 50 (e.g., second slash face) disposed opposite the first side edge 48 both extending between the leading edge 44 and the trailing edge 46. The body 42 further includes a pair of opposed lateral sides 52, 54 extending between the leading and trailing edges 44, 46 and the first and second side edges 48, 50. In certain embodiments, the body 42 (particularly, lateral sides 52, 54) may be arcuate shaped in the circumferential direction 34 between the first and second side edges 48, 50 and/or in the axial direction 30 between the leading and trailing edges 44, 46. The lateral side 52 is configured to interface with a cavity 56 defined between the inner turbine shroud segment 36 and the outer turbine shroud segment 38. The lateral side 54 is configured to be oriented toward the hot gas flow path 47 within the turbine 18.

As described in greater below, the body 42 may include multiple channels (e.g., cooling channels or micro-channels) disposed within the lateral side 54 to help cool the hot gas flow path components (e.g., turbine shroud 40, inner turbine shroud segment 36, etc.). A pre-sintered preform (PSP) layer 58 may be disposed on (e.g., brazed onto) the lateral side 54 so that a first surface 60 of the PSP layer 58 together with the body 42 defines (e.g., enclose) the channels and a second surface 62 of the PSP layer 58 interfaces with the hot gas flow path 47. The PSP layer 58 may be formed of superalloys and brazing material. In certain embodiments, a thermal barrier coating (TBC) may be disposed onto the PSP layer 54. The TBC may be formed of a thermal barrier material such as ceramics (e.g., yttria-stabilized zirconia) and/or refractory oxides (e.g., oxides formed from Group IV, V, and VI elements, oxides modified by Lanthanide series elements such as La, Nd, Gd, Yb, etc.). In certain embodiments, as an alternative to the PSP layer 58 a non-PSP metal sheet may be disposed on the lateral side 54 that together with the body 42 defines the channels. In certain embodiments, the channels may be cast entirely within the body 42 near the lateral side 54. In certain embodiments, as an alternative to the PSP layer 58, a barrier coating or TBC bridging may be utilized to enclose the channels within the body 42.

The body 42 includes hook portions 64, 66 to enable coupling of the inner turbine shroud turbine segment 36 to the outer turbine shroud segment 38. For example, the hook portion 64 (disposed adjacent the leading edge 44) may fit within a recess 68 of the outer turbine shroud segment 38. The hook portion 66 may abut a hook portion 70 of the outer turbine shroud segment 38, which are coupled together via a retainer 72. As mentioned above, the lateral side 52 of the inner turbine shroud segment 36 and the outer turbine shroud segment 38 define the cavity 56. The outer turbine shroud segment 38 is generally proximate to a relatively cool fluid or air (i.e., cooler than the temperature in the hot gas flow path 47) in the turbine 18 from the compressor 24. The outer turbine shroud segment 38 includes a passage (not shown) to receive the cooling fluid or air from the compressor 24 that provides the cooling fluid to the cavity 56. As described in greater detail below, the cooling fluid flows to the channels within the body 42 of the inner turbine shroud segment 36 via inlet passages disposed within the body 42 extending from the lateral side 52 to the channels. Each channel includes a first end portion that includes a hook-shaped portion having a free end and a second end portion. The second end portion may include an exit feature (e.g., a portion of the body 42 extending into the channel) to reduce the blockage of the channel 74 during the coating operation(s) by keeping the channel 74 from being exposed to the slash face (side face) until after the coating process is completed. The exit feature could also act as a metering feature to regulate flow of the cooling fluid within the channel 74. In certain embodiments, each channel itself (excluding the second end portion) acts as a metering feature (e.g., includes a portion of the body 42 extending into the channel). In other embodiments, inlet passages coupled to the hook-shaped portion may include a metering feature (e.g., portion of the body 42 extending into the inlet passage). In certain embodiments, the channel itself, the second end portion, or the inlet passage, or a combination thereof includes a metering feature. In addition, the cooling fluid exits the channels (and the body 42) via the second end portions at the first side edge 48 and/or the second side edge 50. In certain embodiments, the channels may be arranged in an alternating pattern with a channel having the first end portion disposed adjacent the first side edge 48 and the second end portion disposed adjacent the second side edge 50, while an adjacent channel has the opposite orientation (i.e., the first end portion disposed adjacent the second side edge 50 and the second end portion disposed adjacent the first side edge 48). The hook-shaped portions of the channels provide a larger cooling region (e.g., larger than typical cooling systems for turbine shrouds) by increasing a length of cooling channel adjacent the slash faces while keeping flow at a minimum. In addition, the hook-shaped portion enables better spacing of the straight portions of the channels. The shape of the channels is also optimized to provide adequate cooling in the event of plugged channels. The disclosed embodiments of the inner turbine shroud segment may enable cooling of the inner turbine shroud segment with less air (e.g., than typical cooling systems for turbine shrouds) resulting in reduced costs associated with regards to chargeable air utilized in cooling.

Figure 3:
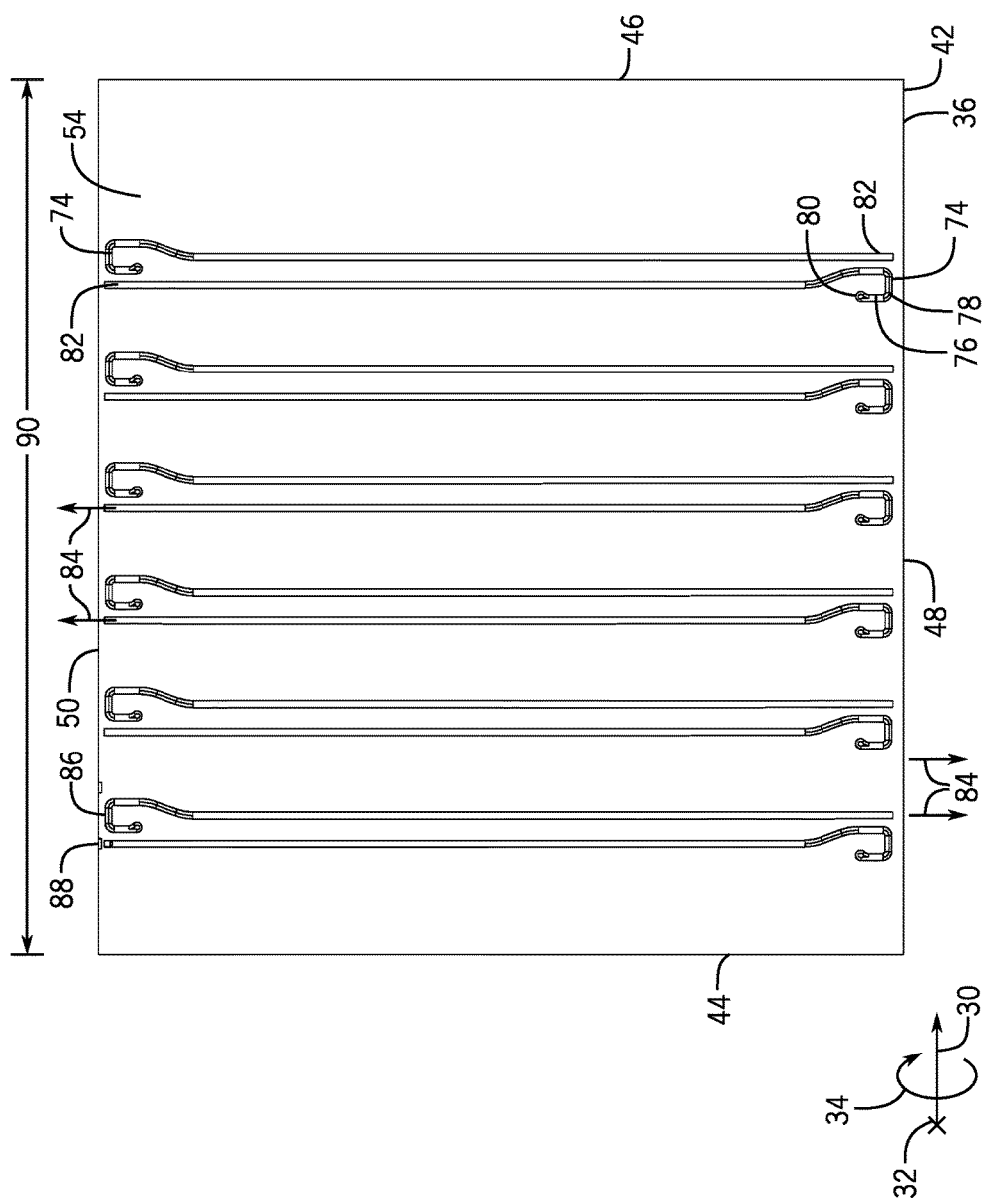
FIG. 3 is a bottom view (e.g., view of lateral side that is oriented toward a hot gas flow path) of an embodiment of an inner turbine shroud segment.

FIG. 3 is a bottom view (e.g., view of the lateral side 54 of the body 42 that is oriented toward hot gas flow path) of an embodiment of the inner turbine shroud segment 36 without the PSP layer 58. As depicted, the body 42 includes a plurality of channels 74 (e.g., cooling channels or micro-channels) disposed within the lateral side 54. The body 42 may include 2 to 40 or more channels 74 (as depicted, the body 42 includes 23 channels 74). Each channel 74 is configured to receive a cooling fluid from the cavity 56. Each channel 74 includes a first end portion 76 that includes a hook-shaped portion 78 having a free end 80. Each hook-shaped portion 78 has a hook turn radius ranging from approximately 0.05 to 4 mm, 0.1 to 3 millimeters (mm), 1.14 to 2.5 mm, and all subranges therebetween. As described in greater detail below, the free end 80 of each hook-shaped portion 78 is coupled to inlet passages that enable the channels 74 to receive the cooling fluid from the cavity 56. The curvature of the hook-shaped portion 78 enables more channels 74 to be disposed within the lateral side 54. In addition, the hook-shaped portion 78 provide a larger cooling region (e.g., larger than typical cooling systems for turbine shrouds) by increasing a length of cooling channel 74 adjacent the side edges 48, 50 while keeping flow at a minimum. In addition, the hook-shaped portion 78 enables better spacing of the straight portions of the channels 74. Further, the turning back of the hook-shaped portion 78 enables the straight portions of the channels to be uniformly distant from an adjacent channel to cook the main portion of the body 42 of the shroud segment 36. In certain embodiments, the hook-shaped portion 78 could be adjusted to enable the spacing of the straight portions of the channels 74 to be tighter packed for higher heat load zones. Overall, the shape of the channels 74 is also optimized to provide adequate cooling in the event of plugged channels 74. Each channel 74 also includes a second end portion 82 that enables the spent cooling fluid to exit the body 42 via the side edges 48, 50 via exit holes as indicated by the arrows 84. In certain embodiments, the second end portion 82 includes a metering feature configured to regulate (e.g., meter) a flow of the cooling fluid within the respective channel 74. In certain embodiments, each channel 74 may form a segmented channel at the second end portion 82. In particular, a bridge portion of the body 42 may extend across each channel 74 (e.g., in a direction from the leading edge 44 to the trailing edge 46) within the second end portion 82 with a portion of the channel 74 upstream of the bridge portion and a portion of the channel 74 downstream of the bridge portion. A passage may extend underneath the bridge portion fluidly connecting the portions of the channel 74 upstream and downstream of the bridge portion. In certain embodiments, each channel 74 itself (excluding the second end portion 82) acts as a metering feature (e.g., includes a portion of the body 42 extending into the channel). In other embodiments, inlet passages coupled to the hook-shaped portion 78 may include a metering feature (e.g., portion of the body 42 extending into the inlet passage). In certain embodiments, the channel 74 itself, the second end portion 82, or the inlet passage, or a combination thereof includes a metering feature.

As depicted, some of the channels 74 (e.g., channel 86) include the hook-shaped portion 78 of the first end portion 76 disposed adjacent the side edge 50 and the second end portion 82 disposed adjacent the side edge 48, while some of the channels 74 (e.g., channel 88) include the hook-shaped portion 78 of the first end portion 76 disposed adjacent the side edge 48 and the second end portion 82 disposed adjacent the side edge 50. In certain embodiments, the channels 74 are disposed in an alternating pattern (e.g., channels 86, 88) with one channel 74 having the hook-shaped portion 78 disposed adjacent one side edge 48 or 50 and the second end portion 82 (e.g., in certain embodiments having the metering feature) disposed adjacent the opposite side edge 48 or 50 with the adjacent channel 74 having the opposite orientation. As depicted, the channels 74 extend between the side edges 48, 50 from adjacent the leading edge 44 to adjacent the trailing edge 46. In certain embodiments, the channels 74 may extend between the side edges 48, 50 covering approximately 50 to 90 percent, 50 to 70 percent, 70 to 90 percent, and all subranges therein, of a length 90 of the body 42 between the leading edge 44 and trailing edge 46. For example, the channels 74 may extend between the side edges 48, 50 covering approximately 50, 55, 60, 65, 70, 75, 80, 85, or 90 percent of the length 90. This enables cooling along both of the side edges 48, 50 as well as cooling across a substantial portion of the body 42 (in particular, the lateral side 54 that is oriented toward the hot gas flow path 47) between both the leading edge 44 and the trailing edge 46 and the side edges 48, 50.

Figure 4:
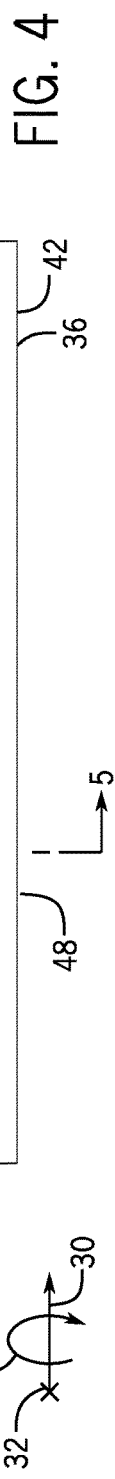
FIG. 4 is a top view (e.g., view of lateral side that interfaces with a cavity) of an embodiment of an inner turbine shroud segment.
Figure 5:
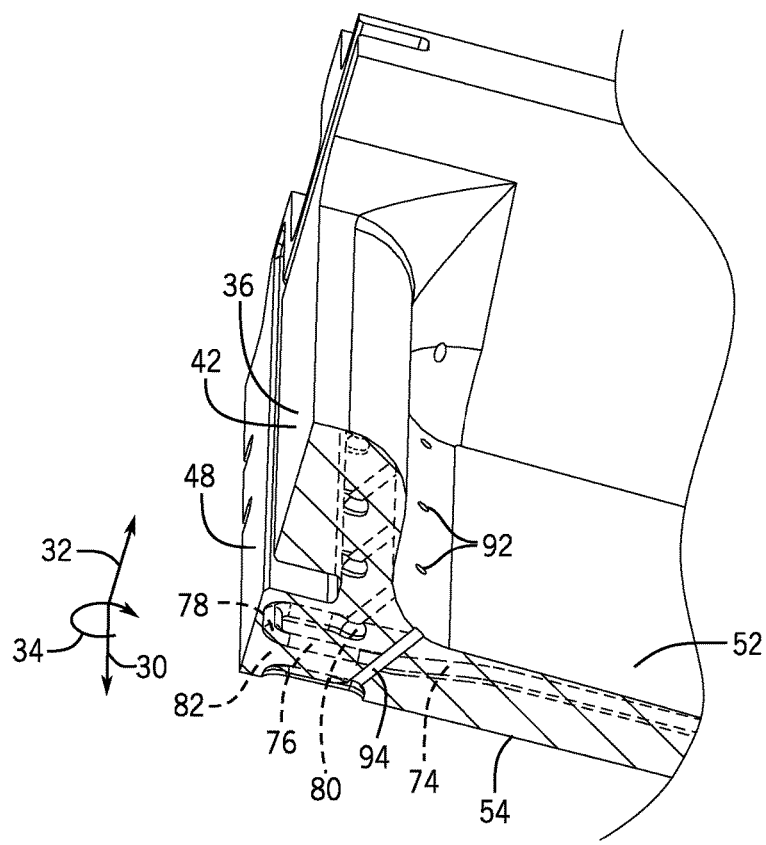
FIG. 5 is a perspective cross-sectional view of an embodiment of a portion of the inner turbine shroud segment of FIG. 4, taken along line 5-5 (with inlet passages and channels shown in dashed lines)

FIG. 4 is a top view (e.g., view of the lateral side 52 that interfaces with the cavity 56) of an embodiment of the inner turbine shroud segment 36. As depicted, the body includes a plurality of opening or apertures 92 that enable cooling fluid to flow from the cavity 56 into the channels 74 via inlet passages. FIG. 5 is a perspective cross-sectional view of an embodiment of the inner turbine shroud segment 36 of FIG. 4, taken along line 5-5. As depicted, inlet passages 94 (shown in dashed lines) extend generally in the radial direction 32 from the free ends 80 of the hook-shaped portions 78 of the channels 74 to the lateral side 52 to enable the flow of cooling fluid into the channels 74. In certain embodiments, the inlet passages 94 may be angled relative to the lateral side 54. For example, an angle of the inlet passages 94 may range between approximately 45 and 90 degrees, 45 and 70 degrees, 70 and degrees, and all subranges therein.

Figure 6:
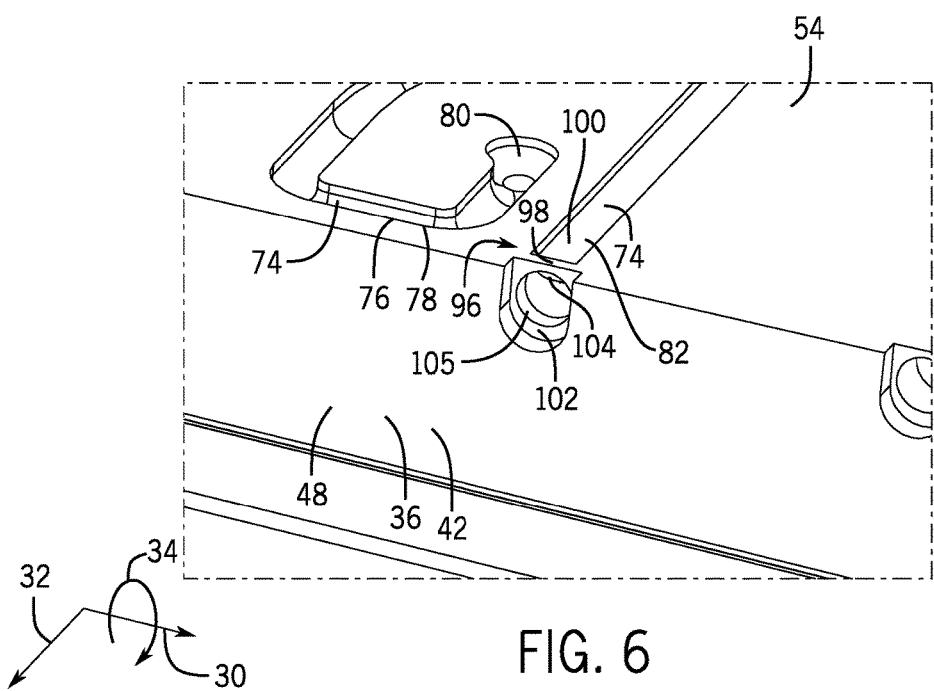
FIG. 6 is a perspective view of an embodiment of a portion of an inner turbine shroud segment.

FIG. 6 is a perspective view of a portion of an embodiment of the inner turbine shroud segment 36 (e.g., without the PSP layer 58) illustrating a segmented channel 96 for the second end portion 82 of the channel 74. In certain embodiments, the second end portion 82 includes a metering feature (e.g., bridge portion 98) configured to regulate (e.g., meter) a flow of the cooling fluid within the respective channel 74. In particular, the bridge portion 98 of the body 42 may extend across each channel 74 (e.g., in a direction (e.g., axial direction 30) from the leading edge 44 to the trailing edge 46) within the second end portion 82 to form the segmented channel 96 with a portion 100 of the channel 74 upstream of the bridge portion 98 and a portion 102 of the channel 74 downstream of the bridge portion 98. The bridge portion 98 may also extend partially into the channel 74 in the radial direction 32. A passage 104 may extend underneath the bridge portion 98 fluidly connecting the portions 100, 102 of the channel 74 upstream and downstream of the channel 74 to enable cooling fluid to exit via exit holes 105. In certain embodiments, each channel 74 itself (excluding the second end portion 82) acts as a metering feature (e.g., includes a portion of the body 42 extending into the channel). In other embodiments, inlet passages 94 coupled to the hook-shaped portion 78 may include a metering feature (e.g., portion of the body 42 extending into the inlet passage). In certain embodiments, the channel 74 itself, the second end portion 82, or the inlet passage 94, or a combination thereof includes a metering feature.

FIG. 7 depicts an embodiment depicting the end portions 81 (e.g., second end portion 82, third end portion 83) of the segmented cooling channels 74. In the illustrated embodiment, the end portions 81 include segmented cooling channels (e.g., a first segmented cooling channel 96, a second segmented channel 108) having an exit feature 106 (e.g., bridge portion 98). The exit features 106 are formed by an electrode (as described in detail below with respect to FIG. 9). In some embodiments, the exit features 106 regulate or meter a flow of cooling fluid such as air within the first channel 86 and the second channel 88, respectively.

FIG. 8 depicts an embodiment depicting the dimensions of the end portions 81 of the segmented cooling channels 74. The end portion 81 may include a first portion 112 disposed adjacent to and upstream 75 from the exit feature 106 and a second portion 114 disposed adjacent to and downstream 77 of the exit feature 106. In the illustrated embodiment, the first portion 112 has a first width 120 in a first direction 122 (e.g., axial direction 30). The second portion 114 has a second width 122 in the first direction (e.g., axial direction 30), and the second width 122 is greater than the first width 120. In some embodiments, the second width 122 may be at least 2, 3, 4, 5, 6, 7, 8, or more times the width of the first width 120.

In the illustrated embodiment, the exit feature 106 may be electric machine discharged into the shroud body 42. The exit feature 106 includes body portions extending across the end portions 81 of the channels 74 in the first direction (e.g., the axial direction 30). The inner shroud segment 36 includes body portions that extend toward the second lateral side 54 (e.g., the outer portion in fluid communication with a hot gas flow path) in a radial direction 32.

In the illustrated embodiment, the inner shroud segment 36 includes a first passage 86 and a second passage 88. The first and second passages 86, 88 have a third width depicted by arrow 124 in a third direction (e.g., radial direction 32) that may be narrower than both the first width 120 and the second width 122. The second end portion 82 and the first body portion 126 define the first passage 86 between the first 112 and second 114 portion of the second end portion 82.

FIG. 9 depicts a shape formed by an electrode to form exit features 106 and the segmented cooling passage 74. The electrode is used to create the segmented cooling channels 74 and the exit features 106. The body 42 may have a body height 109 in the radial direction 32. A channel height 111 may be formed within the body 42 by the electrode where the cooling channels 74 and the exit features 106 are formed. The channel height 111 may be 10 to 75%, 25 to 60%, 30 to 50%, and all subranges therebetween, the height of the body height 109.

Figure 10:
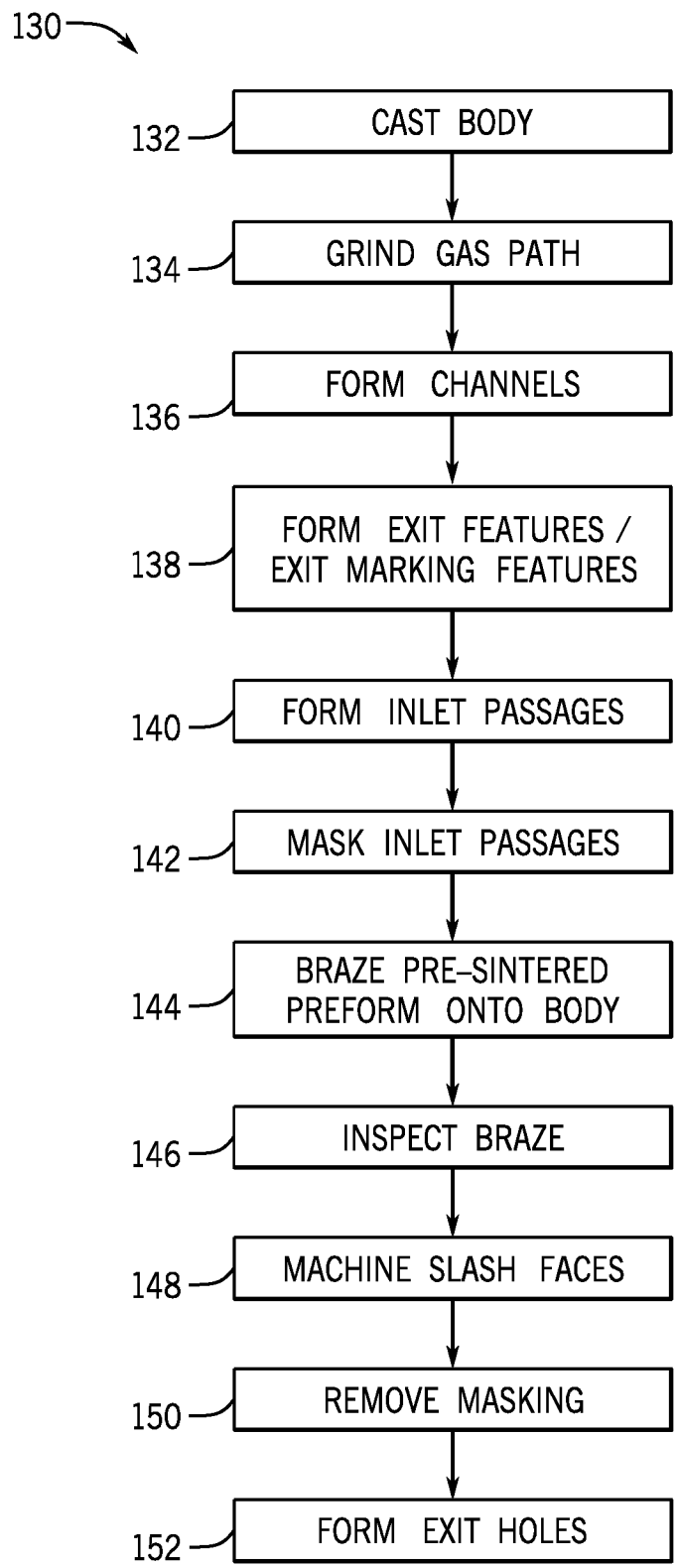
FIG. 10 is a flow chart of an embodiment of a method for manufacturing an inner turbine shroud segment.

As described further with respect to FIG. 10, the first and second portions 112, 114 of the second end portion 82 and the third and fourth portions 116, 118 of the third end portion 83 may be machined into the shroud body 42 by any suitable manufacturing process, such as electrical discharge machining. The first and second portions 112, 114 of the second end portion 82 and the third and fourth portions 116, 118 of the third end portion 83 may be formed prior to the pre-sintered preform layer 58 being brazed or fused onto the second lateral side 54. The first and second passages 86, 88 may be electrical discharge machined into the shroud body 42 by "hole popping" the cooling channels 74 to form the segmented cooling channels 86, 88. The first and second passages 86, 88 may be electrical discharge machined into the shroud body 42 by a hole popping operation after the pre-sintered preform layer 58 is brazed or fused onto the second lateral side 54. In the illustrated embodiment, the first end portion and the fourth end portion 76, 85 include a hook shaped portion 70 having a free end 80. The free ends 80 form respective inlet passages (e.g., cooling passages 74) coupled to each free end 80. The free ends 80 extend in the radial direction 32 to the first lateral side 52 of the shroud body 42. The respective inlet passages (e.g., cooling channels 52, cooling passages) provide a cooling fluid, such as air, from the cavity to each of the respective cooling channels 74.

FIG. 10 is a flow chart of an embodiment of a method 130 for manufacturing the inner turbine shroud segment 36. The method 130 includes casting the body 42 (block 132). The method 130 also includes grinding a gas path surface onto to the body 42 (block 134). In particular, the lateral side 54 that is configured to be oriented toward the hot gas flow path 47 may be grinded into an arcuate shape in the circumferential direction 34 between the first and second side edges 48, 50 and/or in the axial direction 30 between the leading and trailing edges 44, 46. The method 130 further includes electrical discharge machining the channels 74 into the lateral side 54 of the body 42 (block 136). The method 130 yet further includes forming (e.g., machining, electrical discharge machining, etc.) the exit features or exit marking features (e.g., bridge portion 102) that indicate where exits holes 105 in the second end portion 82 of the channels 74 should be drilled or electrical discharge machined (block 138). The method 130 still further includes forming (e.g., machining, electrical discharge machining, etc.) the inlet passages 94 from the lateral 52 to the free ends 80 of the hook-shaped portions 78 of the first end portions 76 of the channels 74 (block 140). The method 130 includes masking the openings or apertures 92 of the inlet passages 94 (block 142) to block debris from getting within the channels 74 during manufacture of the inner turbine shroud segment 36. The method 130 includes brazing the PSP layer 58 onto the lateral side 54 (block 144) so that the first surface 60 of the PSP layer 58 together with the body 42 defines (e.g., encloses) the channels 74 and the second surface 62 of the PSP layer 58 interfaces with the hot gas flow path 47. In certain embodiments, as an alternative to the PSP layer 58 a non-PSP metal sheet may be disposed on the lateral side 54 that together with the body 42 defines the channels 74. In certain embodiments, as an alternative to the PSP layer 58, a barrier coating or TBC bridging may be utilized to enclose the channels 74 within the body 42. The method 130 also includes inspecting the brazing the of the PSP layer 58 to the body 42 (block 146). The method 130 yet further includes machining the slash faces (e.g., side edges 48, 50) (block 148). The method 130 still further includes removing the masking from the openings 92 of the inlet passages 94 (block 150). The method 130 even further includes forming (e.g., machining, electrical discharge machining, etc.) the exit metering holes 105 of the second end portions 82 of the channels 74 to enable the cooling fluid to exit the side edges 48, 50 (block 152). In certain embodiments, the channels 74, the metering features, and the inlet passages 94 may be cast within the body 42.

Technical effects of the disclosed embodiments include utilizing multiple cooling channels to cool areas of a turbine shroud. The cooling channels include at least a first with a first and a second end portion and a second cooling channel with a third and a fourth end portion. The second end portion includes a first segmented channel having a first exit feature, and the third end portion includes a second segmented channel having a second exit feature. The exit features reduce the blockage of the channel during the coating operation (e.g., by keeping the channel from being exposed to the slash face (side face) until after the coating process is completed). The exit feature may also act a metering feature to regulate flow of the cooling fluid within the channel. The first and the second cooling channels and the first and the second exit features may be formed by a suitable process, such as electric machine discharging.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A shroud segment for use in a turbine section of a gas turbine engine, comprising:
   a body including a leading edge, a trailing edge, a first side edge, a second side edge, and a pair of opposed lateral sides between the leading and trailing edges and the first and second side edges, wherein a first lateral side of the pair of opposed lateral sides is configured to interface with a cavity having a cooling fluid, and a second lateral side of the pair of opposed lateral sides is oriented toward a hot gas flow path;
   a first channel disposed within the body, wherein the first channel comprises a first end portion and a second end portion, the first end portion is disposed adjacent the first side edge and the second end portion is disposed adjacent the second side edge; and
   a second channel disposed within the body, wherein the second channel comprises a third end portion and a fourth end portion, the third end portion is disposed adjacent the first side edge and the fourth end portion is disposed adjacent the second side edge; and
   wherein the first and second channels are configured to receive the cooling fluid from the cavity to cool the body, and wherein the second end portion comprises a first segmented channel having a first exit feature and the third end portion comprises a second segmented channel comprising a second exit feature, and the first and second exit features are configured to reduce blockage within the first and second channels, respectively.

2. The shroud segment of claim 1, wherein the second end portion comprises a first portion disposed adjacent to and upstream of the first exit feature and a second portion disposed adjacent to and downstream of the second exit feature, and the third end portion comprises a third portion disposed adjacent to and upstream of the second exit feature and a fourth portion disposed adjacent to and downstream of the second exit feature, and wherein the first and third portions have a first width in a first direction from the first side edge to the second side edge, the second and fourth portions have a second width in the first direction, and the second width is greater than the first width.

3. The shroud segment of claim 2, wherein the first exit feature comprises a first body portion extending across the second end portion of the first channel in the first direction, and the second exit feature comprises a second body portion extending across the third end portion of the second channel in the first direction.

4. The shroud segment of claim 3, wherein the first body portion and the second body portion extend in a radial direction toward the second lateral side.

5. The shroud segment of claim 4, wherein the second end portion and the first body portion define a first passage between the first and second portions of the second end portion, the third end portion and the second body portion define a second passage between the second and fourth portions of the third end portion, and the first and second passages have a third width in a third direction less than both the first and second widths.

6. The shroud segment of claim 5, comprising a pre-sintered preform layer brazed onto the second lateral side, wherein the pre-sintered preform layer comprises a first surface configured to interface with the hot gas flow path and second surface that together with the body defines the first and second channels.

7. The shroud segment of claim 6, wherein the first and second portions of the second end portion and the third and fourth portions of the third end portion are electrical discharge machined into the body prior to the pre-sintered preform layer being brazed onto the second lateral side.

8. The shroud segment of claim 7, wherein the first and second passages are electrical discharge machined into the body via a hole popping operation subsequent to the pre-sintered preform layer being brazed onto the second lateral side.

9. The shroud segment of claim 1, wherein the first end portion and the fourth end portion each comprises a hook-shaped portion having a free end.

10. The shroud segment of claim 9, comprising a respective inlet passage coupled to each free end and extending in a radial direction from the free end to the first lateral side, wherein each respective inlet passage is configured to provide the cooling fluid from the cavity to the respective channel.

11. A gas turbine engine, comprising:
    a compressor;
    a combustion system; and
    a turbine section, comprising:
       a casing;
       a shroud segment coupled to an outer casing;
       a cavity configured to receive a cooling fluid from the compressor, wherein the shroud segment comprises:
          a body including a leading edge, a trailing edge, a first side edge, a second side edge, and a pair of opposed lateral sides between the leading and trailing edges and the first and second side edges, wherein a first lateral side of the pair of opposed lateral sides is configured to interface with the cavity, and a second lateral side of the pair of opposed lateral sides is oriented toward a hot gas flow path;
          a plurality of channels disposed within the body and extending from adjacent the first side edge to adjacent the second side edge, wherein each channel of the plurality of channels comprises a first end portion and a second end portion; and
          wherein the plurality of channels are configured to receive the cooling fluid from the cavity to cool the body, and wherein the respective second end portions each have a segmented channel having a exit feature, and the respective exit features are configured to reduce blockage within the respective channels of the plurality of channels.

12. The gas turbine engine of claim 11, wherein the second end portion comprises a first portion disposed adjacent to and upstream of a first exit feature and a second portion disposed adjacent to and downstream of a second exit feature.

13. The gas turbine engine of claim 12, wherein the first exit feature comprises a first body portion extending across the second end portion of a first channel in a first direction.

14. The gas turbine engine of claim 13, wherein the first body portion extends in a radial direction toward the second lateral side.

15. The gas turbine engine of claim 11, comprising a pre-sintered preform layer brazed onto the second lateral side, wherein the pre-sintered preform layer comprises a first surface configured to interface with the hot gas flow path and a second surface that together with the body defines the plurality of channels.

16. The gas turbine engine of claim 11, wherein the plurality of channels are machined into the body via a hole popping operation subsequent to the pre-sintered preform layer being brazed onto the second lateral side.

17. A method for manufacturing an inner shroud segment for use in a turbine section of a gas turbine engine, comprising:

providing a body of the inner shroud segment, wherein the body includes a leading edge, a trailing edge, a first side edge, a second side edge, and a pair of opposed lateral sides between the leading and trailing edges and the first and second side edges, wherein a first lateral side of the pair of opposed lateral sides is configured to interface with a cavity comprising a cooling fluid defined by the inner shroud segment coupled to an outer shroud segment, and a second lateral side of the pair of opposed lateral sides is oriented toward a hot gas flow path;

forming a plurality of channels within the body extending from adjacent the first side edge to adjacent the second side edge via electrical discharge machining, wherein each channel of the plurality of segmented channels comprises a first end portion and a second end portion, and wherein the respective end portions each have a segmented channel, and wherein the respective end portions each have a segmented channel;

forming target features along the first and second side edges aligned with the second end portions of the plurality of channels via electrical discharge machining;

subsequent to forming the target features, brazing a pre-sintered preform layer onto the second lateral side, wherein the pre-sintered preform layer comprises a first surface configured to interface with the hot gas flow path and a second surface that together with the body defines the plurality of channels; and subsequent to brazing the pre-sintered perform layer onto the second lateral side, forming a respective exit feature of a plurality of exit features within each second end portion of the plurality of channels via electrical discharge machining via a hole popping operation utilizing an electrode.

18. The method of claim 17, comprising metering a flow of a cooling fluid within the second end portions of the plurality of channels and the exit features.

19. The method of claim 18, comprising forming the plurality of exit features to have a first portion upstream of the exit features and a second portion downstream of the exit feature, wherein the first portion has a first width in a first direction, and the second portion has a second width in the first direction, and the second width is greater than the first width.

20. The shroud segment of claim 17, forming a first body portion extending across the second end portion in the first direction to extend in a radial direction toward the second lateral side.

* * * * *